(12) United States Patent
Tang

(10) Patent No.: US 11,101,857 B2
(45) Date of Patent: Aug. 24, 2021

(54) COMMUNICATION METHOD AND BASE STATION

(71) Applicant: JRD Communication (Shenzhen) LTD., Shenzhen (CN)

(72) Inventor: Yanbo Tang, Shenzhen (CN)

(73) Assignee: JRD Communication (Shenzhen) LTD., Shenzhen (CN)

( * ) Notice: Subject to any disclaimer, the term of this patent is extended or adjusted under 35 U.S.C. 154(b) by 0 days.

(21) Appl. No.: 16/754,797

(22) PCT Filed: Oct. 11, 2018

(86) PCT No.: PCT/CN2018/109918
§ 371 (c)(1),
(2) Date: Apr. 9, 2020

(87) PCT Pub. No.: WO2019/072217
PCT Pub. Date: Apr. 18, 2019

(65) Prior Publication Data
US 2021/0194552 A1    Jun. 24, 2021

(30) Foreign Application Priority Data
Oct. 11, 2017   (CN) .......................... 201710949869.4

(51) Int. Cl.
*H04B 7/06* (2006.01)
*G06F 13/42* (2006.01)
(Continued)

(52) U.S. Cl.
CPC .......... *H04B 7/06* (2013.01); *G06F 13/4282* (2013.01); *H04L 27/2626* (2013.01); *H04W 88/08* (2013.01); *G06F 2213/0026* (2013.01)

(58) Field of Classification Search
CPC ... H04B 7/02; H04B 7/04; H04B 7/06; H04B 7/0608; H04B 7/0613; H04B 7/0615; (Continued)

(56) References Cited

U.S. PATENT DOCUMENTS 8,462,658 B2   6/2013 Long et al.
8,467,469 B2   6/2013 Lee et al.
(Continued)

FOREIGN PATENT DOCUMENTS

CN   102025457   4/2011
CN   102273091   12/2011
(Continued)

*Primary Examiner* — Siu M Lee

(57) ABSTRACT

Disclosed are a communication method and a base station. The method includes: the base station, through a controller thereof, receiving a baseband signal to be transmitted which is sent by a first intelligent mobile terminal, generating precoding information for immediate data transmission according to a number of antennas and carrier information, sending the baseband signal and the precoding information to a baseband processor of the base station, processing the baseband signal by the baseband processor according to the precoding information, modulating the processed baseband signal, and sending the modulated signal through a radio frequency (RF) circuit.

20 Claims, 3 Drawing Sheets

(51) Int. Cl.
*H04L 27/26* (2006.01)
*H04W 88/08* (2009.01)

(58) Field of Classification Search
CPC .... H04B 7/0617; H04W 88/00; H04W 88/08; G06F 13/4282; G06F 2213/00; G06F 2213/0026; H04L 27/00; H04L 27/2626
See application file for complete search history.

(56) References Cited

U.S. PATENT DOCUMENTS

| | | |
|---|---|---|
| 8,737,507 B2 | 5/2014 | Astely et al. |
| 8,989,062 B2 | 3/2015 | Rahman et al. |
| 2008/0025262 A1* | 1/2008 | Kim .................. H04W 36/0083 370/331 |
| 2014/0213236 A1* | 7/2014 | Jimbo ..................... H04W 4/16 455/418 |
| 2015/0020157 A1* | 1/2015 | Kim ....................... H01Q 1/243 726/3 |
| 2020/0044719 A1 | 2/2020 | Zhu et al. |

FOREIGN PATENT DOCUMENTS

| | | |
|---|---|---|
| CN | 102792605 | 11/2012 |
| CN | 102859892 | 1/2013 |
| CN | 103856289 | 6/2014 |
| CN | 104184561 | 12/2014 |
| CN | 107979878 | 5/2018 |
| CN | 106685495 | 7/2020 |
| WO | WO 2011/050543 | 5/2011 |

\* cited by examiner

COMMUNICATION METHOD AND BASE STATION

RELATED APPLICATIONS

This application is a National Phase of PCT Patent Application No. PCT/CN2018/109918 having International filing date of Oct. 11, 2018, which claims the benefit of priority of Chinese Patent Application No. 201710949869.4 Oct. 11, 2017. The contents of the above applications are all incorporated by reference as if fully set forth herein in their entirety.

FIELD AND BACKGROUND OF THE INVENTION

The disclosure relates to a technical field of communication technologies, and in particular to a communication method and a base station.

As global 5G technology research is underway, 3GPP standardization is also progressing. Even though currently a standard has not been finalized, 5G is an inexorable trend and will proceed into a commercial stage and enter people's lives around the world.

5G technology is not yet mature as related technical problems are still pending. Uncertainty of 5G protocol is a challenge to terminal software architectural design and testing. Unlike traditional field programmable gate array (FPGA)-based, specialized chip based, or digital signal processor (DSP)-based systems, open 5G wireless systems based on general purpose processor (GPP)-based software architecture can easily use a variety of mature software engineering methods to improve software development efficiency and quality. A key technology of wireless communication is multi-antenna technology. However, multi-antenna system has high demands for processing power of basebands, especially for software of GPP-based radio systems. Using a single machine or a single processor to support as many antennas as possible as well as communication between multiple machines are outstanding issues that need to be solved.

SUMMARY OF THE INVENTION

The disclosure provides a communication method and a base station to enable a single machine/single processor to support as many antennas as possible, and improve communication efficiency between multiple machines.

An embodiment of the application provides

In a first aspect, the invention provides a communication method implemented in a base station, wherein the base station comprises an electrically coupled controller, a plurality of baseband processors, and RF circuits one-to-one corresponding and connected to the baseband processors, and the method comprises:

receiving by a controller a to-be-transmitted baseband signal which is sent by a first intelligent mobile terminal, the baseband signal comprises a number of antennas and carrier information associated with the first intelligent terminal;

generating by the controller precoding information of immediate data transmission according to the number of antennas and the carrier information, and transmitting the to-be-transmitted baseband signal and the precoding information to the baseband processors of the base station, wherein the precoding information includes precoding vectors one-to-one corresponding to the antennas of the first intelligent terminal;

processing the baseband signal by the baseband processors according to the precoding information, modulating the processed baseband signal, and transmitting the modulated signal through the RF circuits corresponding to the baseband processors, wherein the RF circuits match the number of antennas and carrier information associated with the first intelligent terminal, and the baseband processors one-to-one correspond to the RF circuits.

In the communication method, the step of processing the baseband signal by the baseband processors according to the precoding information, modulating the processed baseband signal, and transmitting the modulated signal through the RF circuits corresponding to the baseband processors, includes:

performing physical layer data processing for the baseband signal;

performing vector product of the processed baseband signal and the precoding information; and modulating the vector product processed baseband signal, and transmitting the modulated signal through the RF circuits corresponding to the baseband processors.

In the communication method, the step of processing the baseband signal by the baseband processors according to the precoding information, modulating the processed baseband signal, and transmitting the modulated signal through the RF circuits corresponding to the baseband processors, includes:

processing the baseband signal by the baseband processor according to the precoding information;

modulating the processed baseband signal with multicarrier modulation, wherein the multicarrier modulation is matched with the carrier information; and transmitting the modulated signal via the RF circuits corresponding to the baseband processors.

In the communication method, the step of processing the baseband signal by the baseband processors according to the precoding information, modulating the processed baseband signal, and transmitting the modulated signal through the RF circuits corresponding to the baseband processors, includes:

processing the baseband signal by the baseband processor according to the precoding information, and modulating the processed baseband signal; and transmitting the modulated signal to the RF circuits through a high-speed serial computer expansion bus PCIe, and transmitting the modulated signal through the RF circuit.

In the communication method, the baseband signal comprises at least one from of video data, pictures, audio, and text.

In a second aspect, an embodiment of the disclosure also provides a communication method including:

a controller of the base station receiving a to-be-transmitted baseband signal which is sent by a first intelligent mobile terminal, the baseband signal comprises a number of antennas and carrier information associated with the first intelligent terminal;

generating by the controller precoding information of immediate data transmission according to the number of antennas and the carrier information, and transmitting the to-be-transmitted baseband signal and the precoding information to baseband processors of the base station;

processing the baseband signal by the baseband processors according to the precoding information, modulating the processed baseband signal, and transmitting the modulated signal through the RF circuits corresponding to the baseband processors, wherein the RF circuits match the number of antennas and carrier information associated with the first intelligent terminal, and the baseband processors one-to-one correspond to the RF circuits.

In the communication method, the step of processing the baseband signal by the baseband processors according to the precoding information, modulating the processed baseband signal, and transmitting the modulated signal through the RF circuits corresponding to the baseband processors, includes:

performing physical layer data processing for the baseband signal;

performing vector product of the processed baseband signal and the precoding information; and modulating the vector product processed baseband signal, and transmitting the modulated signal through the RF circuits corresponding to the baseband processors.

In the communication method, the step of processing the baseband signal by the baseband processors according to the precoding information, modulating the processed baseband signal, and transmitting the modulated signal through the RF circuits corresponding to the baseband processors, includes:

processing the baseband signal by the baseband processor according to the precoding information; and modulating the processed baseband signal with multicarrier modulation, wherein the multicarrier modulation is matched with the carrier information; and transmitting the modulated signal via the RF circuits corresponding to the baseband processors.

In the communication method, the step of processing the baseband signal by the baseband processors according to the precoding information, modulating the processed baseband signal, and transmitting the modulated signal through the RF circuits corresponding to the baseband processors, includes:

processing the baseband signal by the baseband processor according to the precoding information, and modulating the processed baseband signal; and transmitting the modulated signal to the RF circuits through a high-speed serial computer expansion bus PCIe, and transmitting the modulated signal through the RF circuit.

In the communication method, the baseband signal includes video data.

In a third aspect, an embodiment of the invention further provides a base station, the base station includes a mutually electrically coupled controller, a plurality of baseband processors, and RF circuits one-to-one corresponding to and connected with the baseband processors;

the controller receiving a to-be-transmitted baseband signal which is sent by a first intelligent mobile terminal, the baseband signal comprises a number of antennas and carrier information associated with the first intelligent terminal, the controller generating precoding information of immediate data transmission according to the number of antennas and the carrier information, and transmitting the to-be-transmitted baseband signal and the precoding information to the baseband processors;

the baseband processors processing the baseband signal according to the precoding information, modulating the processed baseband signal, and transmitting the modulated signal to the RF circuits;

the RF circuits transmitting the modulated signal, wherein the RF circuits matches the number of antennas and carrier information associated with the first intelligent terminal.

In the base station, two baseband processors are integrated on a server, each baseband processor corresponds to a virtual machine connecting to a corresponding RF circuit through the baseband processor.

In the base station, the server is an ESXI hardware system.

In the base station, the virtual machine comprises a 64-bits system.

In the base station, the base station comprises eight baseband processors and eight RF circuits corresponding to the eight baseband processors, the RF circuits comprises 32 antennas allocated and connected to the corresponding baseband processors according to a configured ratio.

In the base station, the baseband processor after receiving the to-be-transmitted baseband signal sent by the controller and the precoding information, is further configured for:

performing physical layer data processing for the baseband signal;

performing vector product of the processed baseband signal and the precoding information; and modulating the vector product processed baseband signal, and transmitting the modulated signal to the RF circuits corresponding to the baseband processors.

In the base station, the baseband signal after the phase-multiplication processing is an orthogonal frequency multiplexing signal.

In the base station, the baseband processor after receiving the to-be-transmitted baseband signal sent by the controller and the precoding information, is further configured for:

processing the baseband signal according to the precoding information; and modulating the processed baseband signal with multicarrier modulation, wherein the multicarrier modulation is matched with the carrier information; and transmitting the modulated signal to the RF circuits corresponding to the baseband processors.

In the base station, the baseband processor after receiving the to-be-transmitted baseband signal sent by the controller and the precoding information, is further configured for:

processing the baseband signal according to the precoding information, and modulating the processed baseband signal; and transmitting the modulated signal to the RF circuits through a high-speed serial computer expansion bus PCIe, and transmitting the modulated signal to the RF circuits corresponding to the baseband processors.

In the base station, the baseband signal comprises at least one form of video data, pictures, audio, and text.

Beneficial Effects:

In the communication method proposed in the embodiment of the disclosure, the multi-antenna system architecture and design method based on general purpose processor (GPP) are different from the traditional FPGA-based, specialized chip-based, or DSP-based systems. The open 5G wireless system based on the general-purpose processor architecture can easily use a variety of mature software engineering methods to improve software development quality and efficiency. The communication method in the embodiments of the disclosure adopts the GPP-based multi-antenna system architecture, effectively improves the single machine/single processor to support as many antennas as possible, improves communication efficiency, and also supports communication between machines to effectively improve the coverage capacity of wireless communication system. On the other hand, the base station is equipped with a baseband processor to provide centralized processing of pre-code matrix and high-level protocols. Additionally, the design ensures one to one correspondence between the baseband processors and the RF circuits, so that each baseband processor correspondingly processes video data and information of video circuits, effectively enhancing the overall data processing power of a multi-antenna system.

DESCRIPTION OF SPECIFIC EMBODIMENTS OF THE INVENTION

The following is a clear and comprehensive description of the technical solutions in the embodiments of the disclosure with reference to the drawings in the embodiments of the application. Obviously, the embodiments described are only part of the disclosure, not for exhaustive illustration. Based on the embodiments of the application, other embodiments which may be easily obtained by those having ordinary skills in the art without paying additional creative effort fall within the scope of the application for protection.

Figure 1:
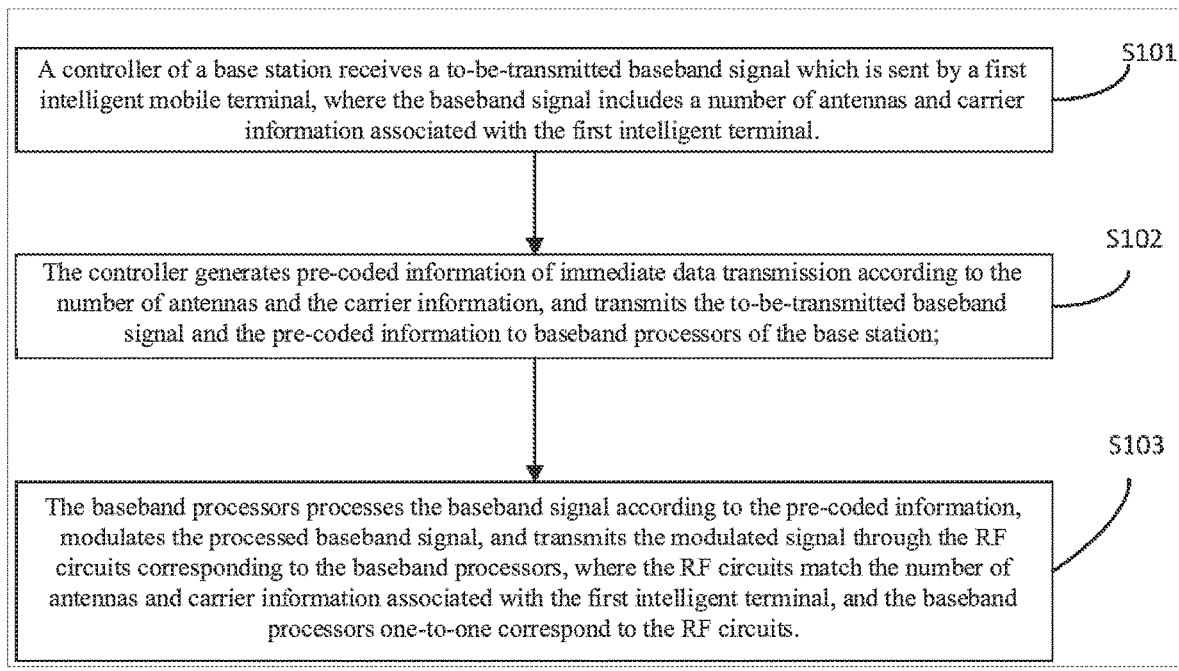
FIG. 1 is a flowchart of a communication method according to an embodiment of the disclosure.

With reference to FIG. 1, FIG. 1 is a flowchart of a communication method according to an embodiment of the disclosure.

As shown in FIG. 1, the communication method of the embodiment includes:

S101: A controller of a base station receiving a to-be-transmitted baseband signal which is sent by a first intelligent mobile terminal, the baseband signal comprising a number of antennas and carrier information associated with the first intelligent terminal.

Specifically, the base station has the controller, baseband processors, servers, virtual machines, and radio frequency (RF) circuits. The controller is configured to receive signals sent from the outside. A first transmission terminal is a mobile terminal or a base station. The base station operates as a signal relay in a communication link. A wireless network provides connections between base stations and servers, a base station and another base station, and the base station and the mobile terminal. When detecting the to-be-transmitted baseband signal sent from the first intelligent mobile terminal, the controller of the base station begins to receive the baseband signal information in real time. Specifically, the baseband signal includes a number of antennas and carrier information associated with the first intelligent terminal.

In a specific scenario of an embodiment, the server is equipped with ESXI hardware system with two baseband processors being integrated on a server. Different from the traditional DSP and FPGA implemented base stations, the base station of the embodiment is implemented by the server executing software of LTE or 5G protocols. Each baseband processor corresponds to a virtual machine (VM), which is electrically connected to a corresponding radio frequency (RF) circuit through a baseband processor. In particular, the virtual machines may be bit systems, in alternative embodiments, the virtual machines can be 32-bit systems.

The base station is equipped with the controller used to receive signals sent from outside. An external sender may be a mobile terminal or a base station. The base station operates as a signal relay in a communication link. A wireless network provides connections between base stations and servers, a base station and another base station, and the base station and the mobile terminal. When detecting the to-be-transmitted baseband signal sent from the first intelligent mobile terminal, the controller of the base station begins to receive the baseband signal information in real time. Specifically, the baseband signal includes a number of antennas and carrier information associated with the first intelligent terminal.

The baseband signal may include information of video data, pictures, audio, text, or any combination of the above information, which are transmitted to the base station in the form of carriers to be received and analyzed by the base station.

S102: The controller generates the precoding information for this immediate data transmission based on the number of antennas and carrier information, and transmits the to-be-transmitted baseband signal as well as the precoding information to the baseband processors of the base station.

The base station is equipped with baseband processors. Upon receiving the external signal and information, the controller extracts the information from the external signal, obtains the number of antennas that send the extracted information and the carrier information, and generates the precoding information of the immediate data transmission. The precoding information includes precoding vectors which correspond one-to-one with the antennas. Transmission time and the data transmitted by each antenna may vary, so the precoding vectors of each antenna need to be associated with the antenna. The controller then transmits the received baseband signal and precoding information to the baseband processors of the base station. This facilitates and improves efficiency of subsequent information packaging and classifying by the baseband processors.

In a modern server architecture, one computer has a plurality of processors. Each antenna in a multi-antenna system, especially a system with 64 or 128 antennas, is configured to transmit different data needs to cooperate and associate with an independent baseband processing unit. If each baseband processing unit requires one processor/central processing unit (CPU) core, a single server may not have sufficient processors to handle such simultaneous processing of the data from so many antennas, and more servers are required. Some cases allow several antennas to share one processor to process data. Generally, the base station side is the side that has multi-antennas, while the number of antennas on the mobile phone side is not much.

After receiving from the controller the baseband signal to be processed, the baseband processor performs physical layer (PHY) processing on the baseband signal, then multiplies the PHY processed data by the precoding vectors corresponding to the data, and modulates the baseband signal after the multiplication, and transmits the modulated signal via the RF circuits corresponding to the baseband processors.

S103: The baseband processor processes the baseband signal according to the precoding information, modulates the processed baseband signal, and transmits the modulated signal through the RF circuits corresponding to the baseband processors, where the RF circuits match the number of antennas and carrier information associated with the first intelligent terminal, and the baseband processors correspond one-to-one with the RF circuits.

After receiving from the controller the baseband signal to be processed, the baseband processor performs PHY processing on the baseband signal, then multiplies the PHY processed data by the precoding vectors corresponding to the data, and modulates the baseband signal after the multiplication, and transmits the modulated signal via the RF circuits corresponding to the baseband processors.

In a specific embodiment, the multiplied data is made into an orthogonal frequency-division multiplexing (OFDM) signal, collectively referred to as the OFDM signal in the following. The process of processing the data into the OFDM signal includes inverse fast fourier transform (IFFT) and adding cyclic prefix (CP). Note that processing the multiplied data into the OFDM signal is not the only way. The multiplied data can also be processed as other signals or not processed. The processing in the example facilitates for the later data transmission in a bus.

Specifically, modulation of the processed baseband signal is carried out in the way of multi-carrier modulation, and the multi-carrier modulation method matches the carrier information to facilitate baseband signal classification and demodulation at the receiving end.

In a specific embodiment, the modulated signal passed from the processors to video circuit is transmitted by the high-speed serial computer expansion bus peripheral component interconnect express (PCIe) to the RF circuits. Then the modulated signal is sent through the RF circuits. Note that although the PCIe bus is preferred, other buses can be selected for data transfer in some other embodiments. Alternatively, multiple bus combinations can be used according to actual needs.

The following embodiment of the disclosure provides a communication method implemented in a base station. The base station comprises an electrically coupled controller, a plurality of baseband processors, and RF circuits one-to-one corresponding to and connected with the baseband processors. The method includes:

The controller receives to-be-transmitted baseband signal which is sent from the first intelligent mobile terminal, where the baseband signal includes a number of antennas and carrier information associated with the first intelligent terminal.

The controller generates precoding information of immediate data transmission according to the number of antennas and the carrier information, and transmits the to-be-transmitted baseband signal and the precoding information to the baseband processors of the base station. The precoding information includes precoding vectors one-to-one corresponding to the antennas of the first intelligent terminal.

The baseband processors process the baseband signal according to the precoding information, modulates the processed baseband signal, and transmits the modulated signal through the RF circuits corresponding to the baseband processors. In particular, the RF circuits match the number of antennas and carrier information associated with the first intelligent terminal, and the baseband processors correspond one-to-one with the RF circuits.

In some embodiments, the step of processing the baseband signal by the baseband processors according to the precoding information, modulating the processed baseband signal, and transmitting the modulated signal through the RF circuits corresponding to the baseband processors, includes:

performing physical layer data processing for the baseband signal;

performing vector product of the processed baseband signal and the precoding information; and modulating the vector product processed baseband signal, and transmitting the modulated signal through the RF circuits corresponding to the baseband processors.

In some embodiments, the step of processing the baseband signal by the baseband processors according to the precoding information, modulating the processed baseband signal, and transmitting the modulated signal through the RF circuits corresponding to the baseband processors, includes:

processing the baseband signal by the baseband processor according to the precoding information;

modulating the processed baseband signal with multicarrier modulation, wherein the multicarrier modulation is matched with the carrier information; and transmitting the modulated signal via the RF circuits corresponding to the baseband processors.

In some embodiments, the step of processing the baseband signal by the baseband processors according to the precoding information, modulating the processed baseband signal, and transmitting the modulated signal through the RF circuits corresponding to the baseband processors, includes:

processing the baseband signal by the baseband processor according to the precoding information, and modulating the processed baseband signal; and transmitting the modulated signal to the RF circuits through a high-speed serial computer expansion bus PCIe, and transmitting the modulated signal through the RF circuit.

In some embodiments, the baseband signal comprises at least one form of video data, pictures, audio, and text.

In comparison with current technology, the GPP-based multi-antenna system architecture and design method in the communication method proposed in the embodiment of the disclosure are different from the traditional FPGA-based, specialized chip-based, or DSP-based systems. The open 5G wireless system based on the GPP architecture can easily use a variety of mature software engineering methods to improve software development quality and efficiency. The communication method in the embodiments of the disclosure adopts the GPP-based multi-antenna system architecture, effectively improves the single machine/single processor to support as many antennas as possible, improves communication efficiency, and also supports communication between machines to effectively improve the coverage capacity of wireless communication system. On the other hand, the base station is equipped with a baseband processor to provide centralized processing of pre-code matrix and high-level protocols. Additionally, the design ensures one to one correspondence between the baseband processors and the RF circuits, so that each baseband processor correspondingly processes video data and information of video circuits, effectively enhancing the overall data processing power of a multi-antenna system.

Figure 2:
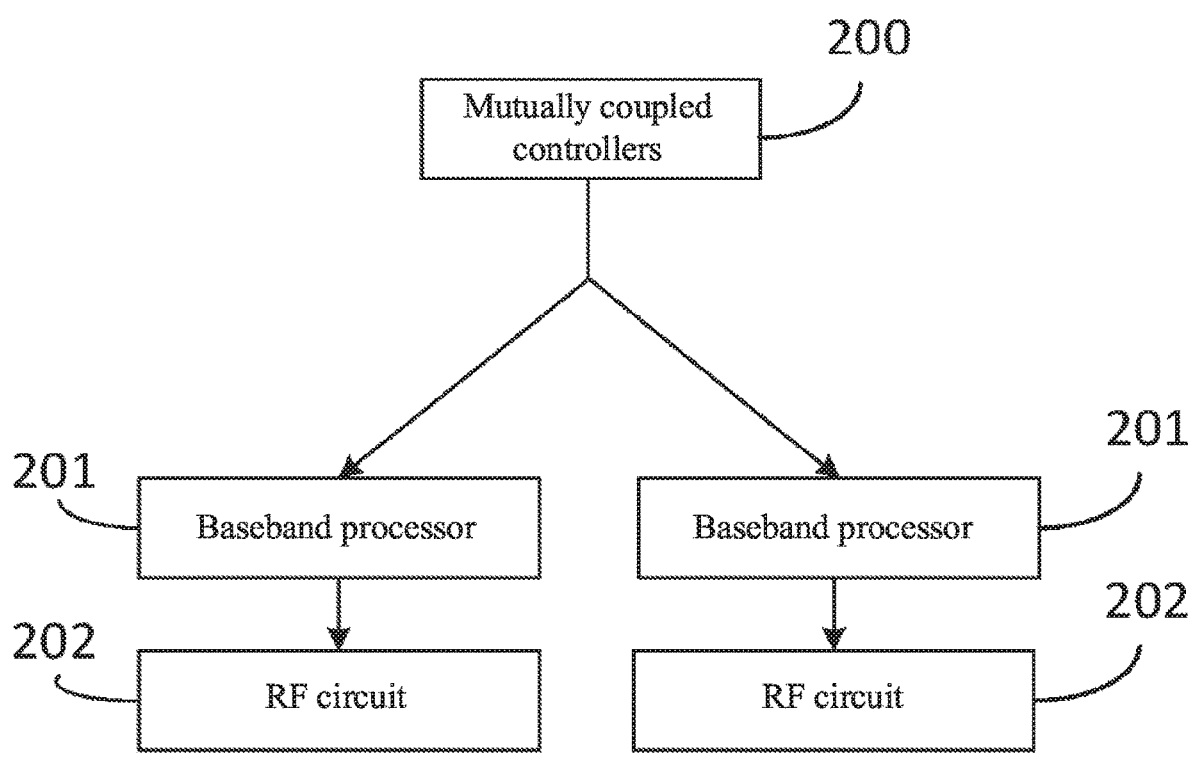
FIG. 2 is a schematic diagram showing a structural view of a base station according to an embodiment of the disclosure.

With reference to FIG. 2, FIG. 2 is a schematic diagram showing a structural view of a base station according to an embodiment of the disclosure. As shown in FIG. 2, the base station comprises a mutually coupled controller 200, baseband processors 201, and RF circuits 202, where the mutually coupled controller 200 can be one or more.

The mutually coupled controller 200 is configured to receive the to-be-transmitted baseband signal sent from the first intelligent mobile terminal, where the baseband signal comprises the number of antennas and carrier information associated with the first intelligent terminal. The precoding information of immediate data transmission is generated according to the number of antennas and the carrier information, and the to-be-transmitted baseband signal as well as the precoding information are transmitted to the baseband processor 201.

The baseband processor 201 is configured to process the baseband signal according to the precoding information, modulate the processed baseband signal, and to send the modulated signal to the RF circuits 202.

The RF circuits 202 are configured to send the modulated signal, where the RF circuits 202 match the number of antennas and carrier information of the first intelligent terminal.

In comparison with current technology, the GPP-based multi-antenna system architecture and design method in the communication method proposed in the embodiment of the disclosure are different from the traditional FPGA-based, specialized chip-based, or DSP-based systems. The open 5G wireless system based on the GPP architecture can easily use a variety of mature software engineering methods to improve software development quality and efficiency. The communication method in the embodiments of the disclosure adopts the GPP-based multi-antenna system architecture, effectively improves the single machine/single processor to support as many antennas as possible, improves communication efficiency, and also supports communication between machines to effectively improve the coverage capacity of wireless communication system. On the other hand, the base station is equipped with a baseband processor to provide centralized processing of pre-code matrix and high-level protocols. Additionally, the design ensures one to one correspondence between the baseband processors and the RF circuits, so that each baseband processor correspondingly processes video data and information of video circuits, effectively enhancing the overall data processing power of a multi-antenna system.

Figure 3:
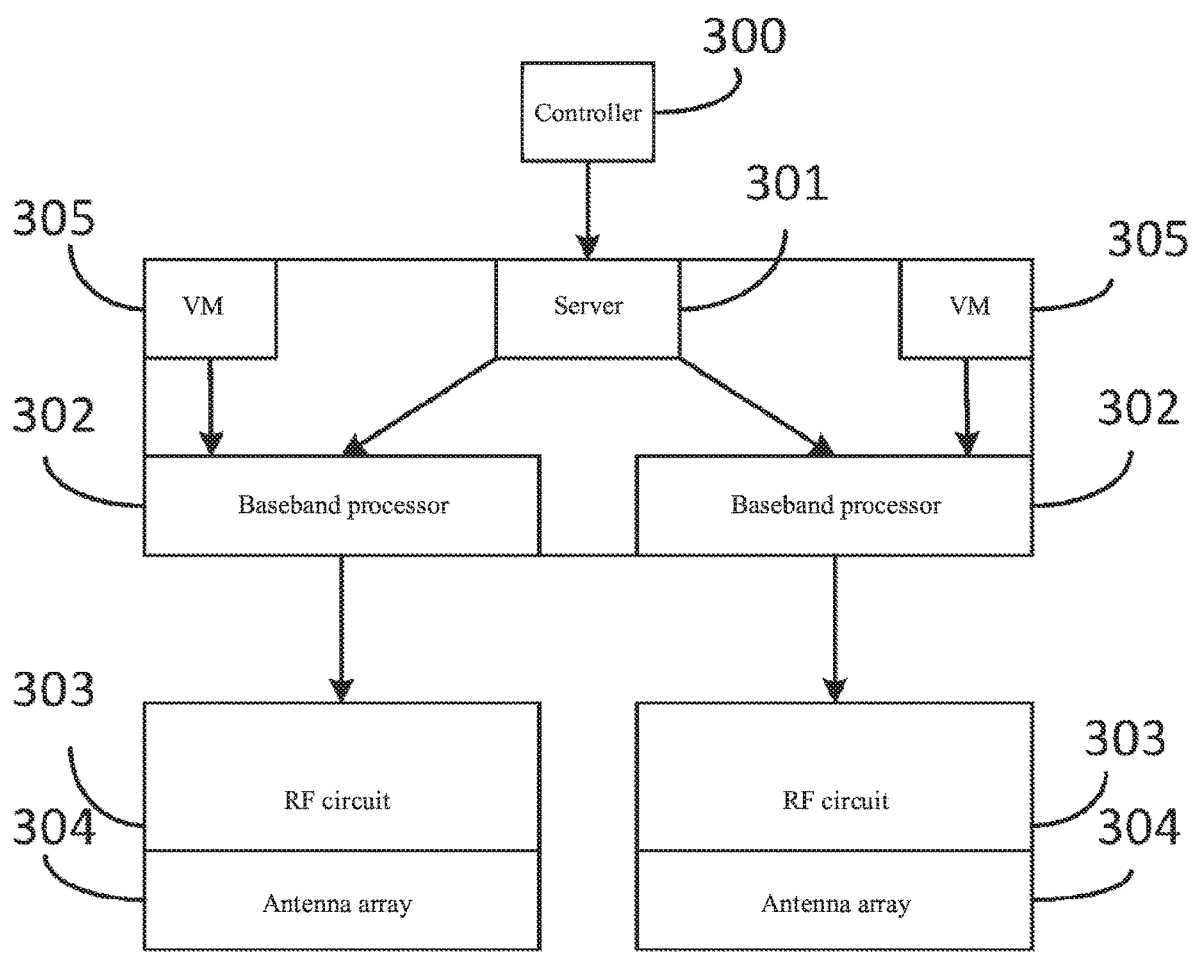
FIG. 3 is a schematic diagram showing a structural view of a base station according to an alternative embodiment of the disclosure.

To further clearly explain the process, with reference to FIG. 3, FIG. 3 is a schematic diagram showing a structural view of a base station according to an alternative embodiment of the disclosure. Specifically, FIG. 3 is a structural schematic diagram of an embodiment of the base station in FIG. 2.

As shown in FIG. 3, the base station includes a controller 300, a server 301, baseband processors 302, RF circuits 303, antenna arrays 304, and virtual machines 305. In a specific embodiment, the base station includes 8 baseband processors and the 8 RF circuits associated with the baseband processors. Each RF circuit 303 comprises an antenna array 304. The antenna array 304 comprises a total of 32 antennas allocated and connected to the corresponding baseband processors according to a configured ratio. In some other embodiments, the relationship between each processor, RF circuit, and antenna can be changed, depending on channel design of RF modules.

In a specific embodiment, the server 301 is equipped with an ESXI hardware system, two baseband processor 302 are integrated on one server 301. Different from the traditional DSP-based and FPGA-based base stations, the base station in the embodiment is implemented with the server 301. LTE or 5G protocol stacks run on the server 301 in the form of software. Each baseband processor 302 is associated and cooperated with a virtual machine 305, and the virtual machine 305 is connected to the associated RF circuits 303 circuit through the baseband processing 302. Specifically, the virtual machine 305 is a 64-bit system. In other embodiments, the virtual machine 305 can be a 32-bit system.

The base station includes the controller 300 configured to receive incoming signals. An external transmitter may be a mobile terminal or a base station. The base station operates as a signal relay in a communication link. A wireless network provides connections between base stations and servers, a base station and another base station, and the base station and the mobile terminal. When detecting a to-be-transmitted baseband signal sent from the first intelligent mobile terminal, the controller 300 of the base station begins to receive the baseband signal information in real time. Specifically, the baseband signal includes a number of antennas and carrier information associated with the first intelligent terminal.

Baseband signal may include video data, pictures, audio, text, or any combination of the above information, transmitted to the base station in forms of carriers to facilitate reception and analysis by the base station.

In a specific embodiment, the base station has the server 301 installed, and each server 301 is equipped with two baseband processors 302. When receiving incoming signal information, the controller 300 extracts the information to obtain the number of antennas that send the information and the carrier information, and generates the precoding information for this immediate data transmission. The precoding information includes precoding vectors one-to-one corresponding to the antennas. Transmission time and the data transmitted by each antenna may vary, so the precoding vectors of each antenna needs to be associated with the antenna. The controller 300 then transmits the received baseband signal and precoding information to the baseband processors 302 of the base station. This facilitates and improves efficiency of subsequent information packaging and classifying by the baseband processors.

In a modern server architecture, one computer has a plurality of processors. Each antenna in a multi-antenna system, especially a system with 64 or 128 antennas, is configured to transmit different data needs to cooperate and associate with an independent baseband processing unit. If each baseband processing unit requires one processor/central processing unit (CPU) core, a single server may not have sufficient processors to handle such simultaneous processing of the data from so many antennas, and more servers are required. Some cases allow several antennas to share one processor to process data. Generally, the base station side is the side having multi-antennas, while the number of antennas on the mobile phone side is not much.

After receiving from the controller the baseband signal to be processed, the baseband processor performs physical layer (PHY) processing on the baseband signal, then multiplies the PHY processed data by the precoding vectors corresponding to the data, and modulates the baseband signal after the multiplication, and transmits the modulated signal via the RF circuits 303 corresponding to the baseband processors.

In a specific embodiment, the multiplied data is made into an orthogonal frequency-division multiplexing (OFDM) signal, collectively referred to as the OFDM signal in the following. The process of processing the data into the OFDM signal includes inverse fast fourier transform (IFFT) and adding cyclic prefix (CP). Note that processing the multiplied data into the OFDM signal is not the only way. The multiplied data can also be processed as other signals or not processed. The processing in the example facilitates for the later data transmission in a bus.

Specifically, modulation of the processed baseband signal is carried out in the way of multi-carrier modulation, and the multi-carrier modulation method matches the carrier information to facilitate baseband signal classification and demodulation at the receiving end.

In a specific embodiment, the modulated signal passed from the processors to video circuit is transmitted by the high-speed serial computer expansion bus PCIe to the RF circuits 303. Then the modulated signal is sent through the RF circuits. Note that although the PCIe bus is preferred, other buses can be selected for data transfer in some other embodiments. Alternatively, multiple bus combinations can be used according to actual needs.

In comparison with current technology, the GPP-based multi-antenna system architecture and design method in the communication method proposed in the embodiment of the disclosure are different from the traditional FPGA-based, specialized chip-based, or DSP-based systems. The open 5G wireless system based on the GPP architecture can easily use a variety of mature software engineering methods to improve software development quality and efficiency. The communication method in the embodiments of the disclosure adopts the GPP-based multi-antenna system architecture, effectively improves the single machine/single processor to support as many antennas as possible, improves communication efficiency, and also supports communication between machines to effectively improve the coverage capacity of wireless communication system. On the other hand, the base station is equipped with a baseband processor to provide centralized processing of pre-code matrix and high-level protocols. Additionally, the design ensures one to one correspondence between the baseband processors and the RF circuits, so that each baseband processor correspondingly processes video data and information of video circuits, effectively enhancing the overall data processing power of a multi-antenna system.

The above description is merely some embodiments of the present invention, which does not limit the scope of the invention. Any equivalent structure or process modification based on the specification and drawing of the invention, or any application of disclosure either directly or indirectly applied in other relevant technical fields, are included in the scope of claims of the invention.

What is claimed is:

1. A communication method implemented in a base station, wherein the base station comprises an electrically coupled controller, a plurality of baseband processors, and RF circuits one-to-one corresponding to and connected with the baseband processors, and the method comprises:
receiving by the controller a to-be-transmitted baseband signal which is sent by a first intelligent mobile terminal, wherein the baseband signal comprises a number of antennas and carrier information associated with the first intelligent mobile terminal;
generating by the controller precoding information of immediate data transmission according to the number of antennas and the carrier information, and transmitting the to-be-transmitted baseband signal and the precoding information to the baseband processors of the base station, wherein the precoding information includes precoding vectors one-to-one corresponding to the antennas of the first intelligent mobile terminal; and
processing the baseband signal by the baseband processors according to the precoding information, modulating the processed baseband signal, and transmitting the modulated signal through the RF circuits corresponding to the baseband processors, wherein the RF circuits match the number of antennas and the carrier information associated with the first intelligent mobile terminal, and the baseband processors correspond one-to-one with the RF circuits.

2. The communication method of claim 1, wherein the step of processing the baseband signal by the baseband processors according to the precoding information, modulating the processed baseband signal, and transmitting the modulated signal through the RF circuits corresponding to the baseband processors, comprises:
performing physical layer data processing for the baseband signal;
performing vector product of the processed baseband signal and the precoding information; and
modulating the vector product processed baseband signal, and transmitting the modulated signal through the RF circuits corresponding to the baseband processors.

3. The communication method of claim 1, wherein the step of processing the baseband signal by the baseband processors according to the precoding information, modulating the processed baseband signal, and transmitting the modulated signal through the RF circuits corresponding to the baseband processors, comprises:
processing the baseband signal by the baseband processor according to the precoding information;
modulating the processed baseband signal with multicarrier modulation, wherein the multicarrier modulation is matched with the carrier information; and
transmitting the modulated signal via the RF circuits corresponding to the baseband processors.

4. The communication method of claim 1, wherein the step of processing the baseband signal by the baseband processors according to the precoding information, modulating the processed baseband signal, and transmitting the modulated signal through the RF circuits corresponding to the baseband processors, comprises:
processing the baseband signal by the baseband processor according to the precoding information, and modulating the processed baseband signal; and
transmitting the modulated signal to the RF circuits through a high-speed serial computer expansion bus PCIe, and transmitting the modulated signal through the RF circuits.

5. The communication method of claim 1, wherein the baseband signal comprises at least one form of video data, pictures, audio, or text.

6. A communication method, comprising:
a controller of a base station receiving a to-be-transmitted baseband signal which is sent by a first intelligent mobile terminal, the baseband signal comprises a number of antennas and carrier information associated with the first intelligent mobile terminal;
generating by the controller precoding information of immediate data transmission according to the number of antennas and the carrier information, and transmitting the to-be-transmitted baseband signal and the precoding information to baseband processors of the base station; and
processing the baseband signal by the baseband processors according to the precoding information, modulating the processed baseband signal, and transmitting the modulated signal through RF circuits corresponding to the baseband processors, wherein the RF circuits match the number of antennas and the carrier information associated with the first intelligent mobile terminal, and the baseband processors correspond one-to-one with the RF circuits.

7. The communication method of claim 6, wherein the step of processing the baseband signal by the baseband processors according to the precoding information, modulating the processed baseband signal, and transmitting the modulated signal through the RF circuits corresponding to the baseband processors, comprises:
performing physical layer data processing for the baseband signal;
performing vector product of the processed baseband signal and the precoding information; and
modulating the vector product processed baseband signal, and transmitting the modulated signal through the RF circuits corresponding to the baseband processors.

8. The communication method of claim 6, wherein the step of processing the baseband signal by the baseband processors according to the precoding information, modulating the processed baseband signal, and transmitting the modulated signal through the RF circuits corresponding to the baseband processors, comprises:
  processing the baseband signal by the baseband processor according to the precoding information;
  modulating the processed baseband signal with multicarrier modulation, wherein the multicarrier modulation is matched with the carrier information; and
  transmitting the modulated signal via the RF circuits corresponding to the baseband processors.

9. The communication method of claim 6, wherein the step of processing the baseband signal by the baseband processors according to the precoding information, modulating the processed baseband signal, and transmitting the modulated signal through the RF circuits corresponding to the baseband processors, comprises:
  processing the baseband signal by the baseband processor according to the precoding information, and modulating the processed baseband signal; and
  transmitting the modulated signal to the RF circuits through a high-speed serial computer expansion bus PCIe, and transmitting the modulated signal through the RF circuits.

10. The communication method of claim 6, wherein the baseband signal comprises at least one form of video data, pictures, audio, or text.

11. A base station comprising an electrically coupled controller, a plurality of baseband processors, and RF circuits one-to-one corresponding to and connected with the baseband processors;
  the controller receives a to-be-transmitted baseband signal which is sent by a first intelligent mobile terminal, the baseband signal comprises a number of antennas and carrier information associated with the first intelligent mobile terminal, the controller generates precoding information of immediate data transmission according to the number of antennas and the carrier information, and transmits the to-be-transmitted baseband signal and the precoding information to the baseband processors;
  the baseband processors process the baseband signal according to the precoding information, modulates the processed baseband signal, and transmits the modulated signal to the RF circuits; and
  the RF circuits transmit the modulated signal, wherein the RF circuits match the number of antennas and the carrier information associated with the first intelligent mobile terminal.

12. The base station of claim 11, wherein two baseband processors are integrated on a server, and each baseband processor corresponds to a virtual machine connecting to a corresponding RF circuit through the baseband processor.

13. The base station of claim 12, wherein the server is an ESXI hardware system.

14. The base station of claim 12, wherein the virtual machine comprises a 64-bit system.

15. The base station of claim 11, wherein the base station comprises eight baseband processors and eight RF circuits corresponding to the eight baseband processors, and the RF circuits comprise 32 antennas allocated and connected to the corresponding baseband processors according to a configured ratio.

16. The base station of claim 11, wherein the baseband processor after receiving the to-be-transmitted baseband signal sent by the controller and the precoding information, is further configured to:
  perform physical layer data processing for the baseband signal;
  perform vector product of the processed baseband signal and the precoding information; and
  modulate the vector product processed baseband signal, and transmit the modulated signal to the RF circuits corresponding to the baseband processors.

17. The base station of claim 16, wherein the vector product processed baseband signal is an orthogonal frequency-division multiplexing signal.

18. The base station of claim 11, wherein the baseband processor after receiving the to-be-transmitted baseband signal sent by the controller and the precoding information, is further configured to:
  process the baseband signal according to the precoding information;
  modulate the processed baseband signal with multicarrier modulation, wherein the multicarrier modulation is matched with the carrier information; and
  transmit the modulated signal to the RF circuits corresponding to the baseband processors.

19. The base station of claim 11, wherein the baseband processor after receiving the to-be-transmitted baseband signal sent by the controller and the precoding information, is further configured to:
  process the baseband signal according to the precoding information, and modulate the processed baseband signal; and
  transmit the modulated signal to the RF circuits through a high-speed serial computer expansion bus PCIe, and transmit the modulated signal to the RF circuits corresponding to the baseband processors.

20. The base station of claim 11, wherein the baseband signal comprises at least one form of video data, pictures, audio, or text.

* * * * *